United States Patent [19]

Titus

[11] 4,096,366
[45] Jun. 20, 1978

[54] MEANS FOR DETECTING A LOSS OF VACUUM IN VACUUM-TYPE CIRCUIT INTERRUPTERS USED IN POLYPHASE A.C. VACUUM CIRCUIT BREAKER

[75] Inventor: Charles Hoff Titus, Newtown Square, Pa.

[73] Assignee: General Electric Company, Philadelphia, Pa.

[21] Appl. No.: 737,923

[22] Filed: Nov. 1, 1976

[51] Int. Cl.² ............................................ H01H 33/66
[52] U.S. Cl. ................................ 200/144 B; 361/120; 361/2
[58] Field of Search ................... 200/144 B; 361/120, 361/115, 65; 307/136

[56] References Cited

U.S. PATENT DOCUMENTS

| | | | |
|---|---|---|---|
| 3,263,162 | 7/1966 | Lucek et al. | 200/144 B |
| 3,622,867 | 11/1971 | Topper et al. | 361/115 |
| 3,735,201 | 5/1973 | May | 307/136 |
| 3,777,215 | 12/1973 | D'Esopo | 361/65 |

*Primary Examiner*—Robert S. Macon

*Attorney, Agent, or Firm*—William Freedman; Carl L. Silverman

[57] ABSTRACT

This loss-of-vacuum detecting means for a vacuum circuit breaker utilizes input information derived from the current transformers of the overcurrent-sensing means typically present in medium voltage switchgear. In this overcurrent-sensing means, the current transformer secondaries for the respective phases of the switchgear are connected in parallel with each other across a shorting conductor; and in series with each secondary is the operating coil of an overcurrent relay. Connected in the shorting conductor is an "a" switch that is closed when the vacuum circuit breaker is closed and is opened when the circuit breaker is opened. Rectifying means is connected across said switch for developing a d.c. voltage when said switch is opened and one or more of said secondary windings is energized. Time-delay relay means is arranged to be energized by said d.c. voltage and is operable when the voltage thereacross exceeds a predetermined level for a predetermined minimum period following opening of said switch. Operation of said relay means is indicative of a loss of vacuum in one of the vacuum interrupters of the vacuum circuit breaker.

9 Claims, 2 Drawing Figures

MEANS FOR DETECTING A LOSS OF VACUUM IN VACUUM-TYPE CIRCUIT INTERRUPTERS USED IN POLYPHASE A.C. VACUUM CIRCUIT BREAKER

BACKGROUND

This invention relates to means for detecting a loss of vacuum in any one of the vacuum-type circuit interrupters of a polyphase a.c. vacuum circuit breaker and, more particularly, relates to detecting means of this type which is very simple and inexpensive and relies for its operation to a large extent upon components already present in typical switchgear comprising a circuit breaker of the type used for protecting medium voltage three-phase a.c. power distribution circuits. Such switchgear is usually referred to as medium voltage metal-clad switchgear. Medium voltage denotes a voltage rating of between 2.4 kV and 38 kV.

Typical switchgear of the above type includes overcurrent-sensing means comprising three current transformer secondaries, one for each phase, connected in parallel with each other across a shorting conductor. In each of the parallel-connected branches of this overcurrent-sensing circuit and in series with the associated current transformer secondary, there is an input circuit of an overcurrent relay. The current transformer secondary for each phase delivers to the associated overcurrent relay a current substantially proportional to the primary current through the associated phase conductor. This secondary current flows through the series combination of the current transformer secondary, the input circuit of the associated overcurrent relay, and the shorting conductor. When the phase current exceeds a predetermined value, the associated overcurrent relay responds to the resulting increased secondary current by operating to initiate tripping of the circuit breaker.

SUMMARY

An object of my invention is to utilize the current transformer secondaries of the above-described overcurrent-sensing circuit for supplying input intelligence to my loss-of-vacuum detecting means and to do this in such a way that there is no interference with the ability of the overcurrent-sensing circuit to respond in the usual manner to overcurrents.

Another object is to provide loss-of-vacuum detecting means that performs as in the immediately-preceding paragraph and yet is very simple and inexpensive.

Another object is to provide loss-of-vacuum detecting means that meets the above two objectives, is sensitive to a wide range of leakage currents through a faulty vacuum interrupter, and despite its sensitivity to low leakage currents, is capable of withstanding without damage the effects of very high currents through the interrupters.

In carrying out the invention in one form, I provide an "a" switch in the above-described shorting conductor of the typical overcurrent-sensing means used in medium voltage switchgear. This "a" switch is closed when the circuit breaker is closed and is opened when the circuit breaker is opened. Rectifying means is connected across said switch for developing a d.c. voltage when said switch is opened and one or more of the secondary windings of the overcurrent sensing means is energized. Time-delay relay means is arranged to be energized by this d.c. voltage and is operable when the voltage thereacross exceeds a predetermined level for a predetermined period following opening of said switch. Operation of said relay means is indicative of a loss of vacuum in one of the vacuum interrupters of the circuit breaker.

BRIEF DESCRIPTION OF DRAWINGS

For a better understanding of the invention, reference may be had to the accompanying drawings, wherein.

DETAILED DESCRIPTION OF PREFERRED EMBODIMENTS

Figure 1:
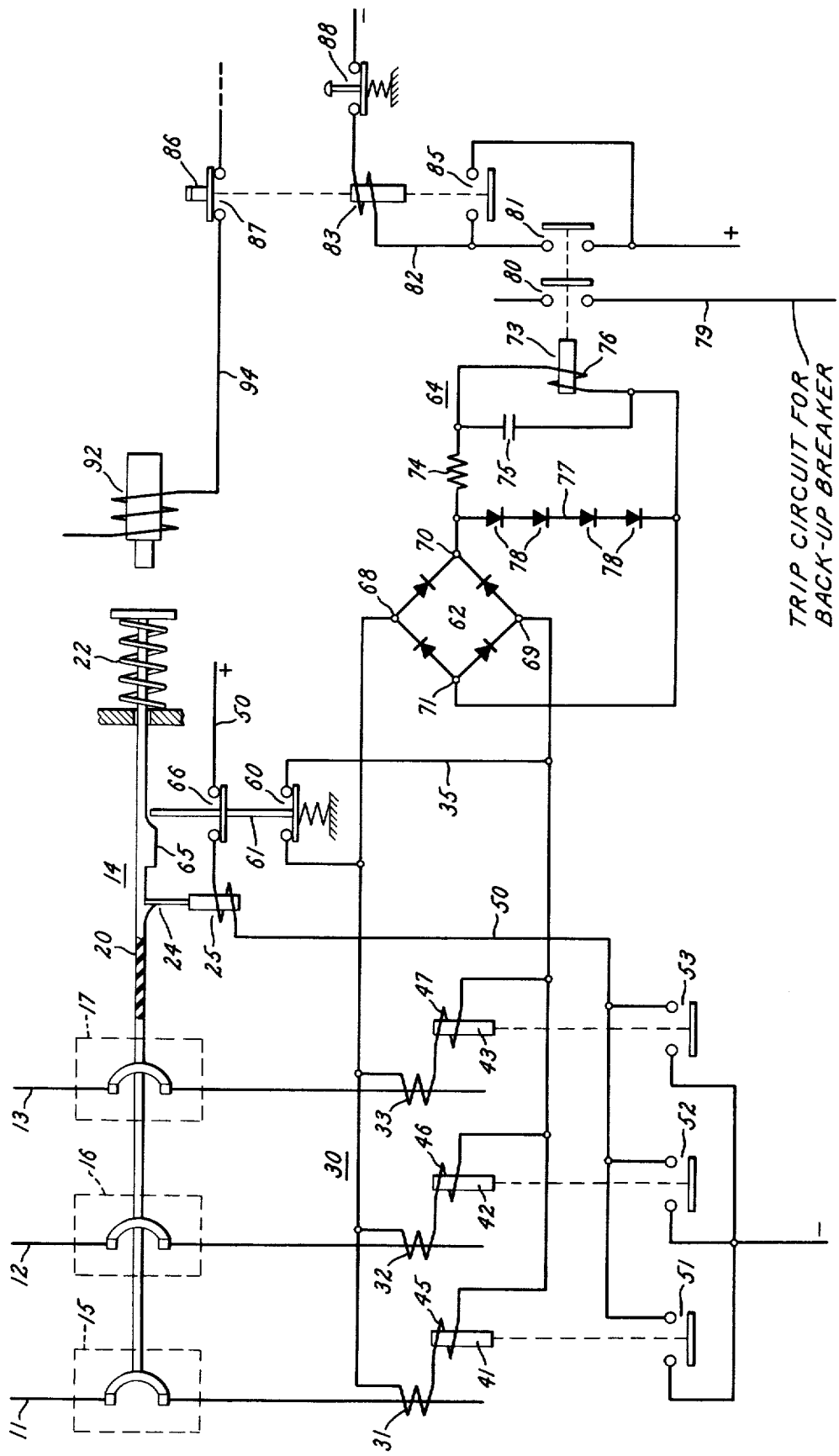
FIG. 1 is a schematic showing of switchgear including a vacuum circuit breaker and loss-of-vacuum detecting means for the circuit breaker embodying one form of my invention.

Referring now to FIG. 1, there is shown a polyphase a-c power distribution circuit comprising three phase conductors 11, 12 and 13. Current through this circuit is controlled by a three-phase circuit breaker 14 comprising three circuit interrupters 15, 16 and 17. Each interrupter is a vacuum-type circuit interrupter of a conventional form, for exmaple, the form disclosed in U.S. Pat. No. 3,441,698—Sofianek, assigned to the assignee of the present invention. Since the details of the interrupter constitute no part of the present invention, they have not been shown in FIG. 1.

The movable contacts of the three interrupters are mechanically coupled together by means of an insulating operating element 20. An opening spring 22 acts on this operating element to bias the movable contacts of the three interrupters from their closed position shown toward an open position in which the contacts of each interrupter are fully separated.

The movable contacts are latched in their closed position illustrated by conventional latching means 24 operable by means of a tripping solenoid 25. When solenoid 25 is energized, it operates to release the latch and allow the circuit breaker to open under the influence of opening spring 22.

The switchgear in which circuit breaker 14 is located includes overcurrent-sensing means 30 that will cause the breaker to trip open in response to an overcurrent in any of the three phases 11, 12 or 13. This overcurrent-sensing means comprises three current-transformer secondary windings 31, 32, and 33, one for each phase. These three current-transformer secondary windings are connected in parallel with each other across a shorting conductor 35. The shorting conductor 35 is in effect connected in series with the three parallel-connected branches that contain the current-transformer secondary windings. Three overcurrent relays 41, 42 and 43 are provided, and these relays have their respective operating coils 45, 46 and 47 connected in the three parallel branches in series with the associated secondary windings.

Each of the overcurrent relays has a set of normally open contacts that is connected in a tripping circuit 50 in series with the tripping solenoid 25. These contacts, which are designated 51, 52 and 53, respectively, are connected in parallel with each other in the tripping circuit 50. When current through each phase conductor is below a predetermined value, the secondary current in each of the parallel-connected branches is insufficient to operate the associated overcurrent relay. But when the current in any phase exceeds a predetermined minimum value, the associated current transformer develops sufficient secondary current in its associated branch to operate the associated overcurrent relay. This secondary current follows a path through the associated branch and through the shorting conductor 35 connected thereacross. When the associated overcurrent relay thus operates, it completes the trip circuit 50, causing solenoid 25 to trip the circuit breaker.

The overcurrent-sensing means 30, as described up to this point in this "Detailed Description of Preferred Embodiments," is generally conventional. A basic object of my invention is to utilize the current transformers of such an overcurrent-sensing means to detect a loss of vacuum in any one of the three vacuum circuit interrupters 15, 16 or 17 without interfering with the ability of the overcurrent-sensing circuit to respond in the usual manner to overcurrents.

I attain this objective, first, by providing a set of "a" switch contacts 60 in the shorting conductor 35 and, second, by connecting across the "a" switch contacts 60 a rectifier 62 and time-delay relay means 64, sometimes referred to hereinafter as loss-of-vacuum relay means.

The "a" (61) is a switch that is closed when the circuit breaker is closed and is open when the circuit breaker is opened. In the schematic ilustration of FIG. 1, a cam 65 is provided on circuit breaker operating element 20 for operating the "a" switch. When the circuit breaker opens, cam 65 immediately depresses the plunger of the "a" switch, forcing the contacts 60 to open. The "a" switch includes another set of normally-closed contacts 66 which are also opened when the circuit breaker is opened. These additional contacts, which are connected in tripping circuit 50, serve to protect the tripping solenoid 25 from continued energization after the circuit breaker has opened.

Rectifier 62 is a conventional full-wave rectifying bridge having its a-c terminals 68 and 69 connected across the contacts 60 of the "a" switch and its d.c. terminals 70 and 71 connected across the time-delay relay means 64. The time-delay relay means, in the illustrated embodiment, comprises a sensitive telephone-type relay 73, a resistor 74, and a capacitor 75 is series with the resistor 74. The operating coil 76 of the relay is connected in series with resistor 74 and in parallel with capacitor 75. The capacitor is normally maintained discharged by the low resistance relay operating coil 76. A shunting path 77 is connected across the d.c. terminals of the rectifier 62 and includes non-linear resistivity conducting means in the form of a plurality of diodes 78 connected in series in the shunting path.

When a voltage is applied across the d.c. terminals 70 and 71 of the rectifier 62, the capacitor 75 charges at a rate determined by the RC time-constant of circuit 74, 77, 75. When a predetermined voltage is attained across the capacitor 75, the relay 73 picks up, thereby closing its normally-open contacts 80 and 81. Such operation of relay 73 is used to indicate a loss of vacuum in an interrupter, as will soon be explained.

So long as the circuit breaker 14 is closed, as shown, the "a" switch contacts 60 are closed and shorting conductor 35 is complete. With the shorting conductor 35 complete, no voltage is applied to the a.c. terminals of the bridging rectifier 62, and the overcurrent-sensing means 30 is, in effect, electrically isolated from the time-delay relay means 64. This electrical isolation, while maintained, allows the overcurrent-sensing means 30 to perform in its normal manner to initiate circuit-breaker tripping in response to an overcurrent without affecting or being affected by the presence of time-delay relay means 64. It is only when circuit breaker 14 is opened that the isolation between these two circuits (30 and 64) is removed (by opening of "a" switch contacts 60).

Under normal interrupting conditions, when a vacuum interrupter has reached its fully-open position, the intercontact arc has been extinguished and interruption therein has been completed. Occasionally, in a normally-functioning vacuum interrupter, arcing will persist for a few half-cycles following full contact-separation and will then be terminated. If arcing persists for longer than a predetermined minimum period of, say, 3 cycles following complete contact separation, this indicates a failure of the interrupter, such as might result from a loss of vacuum. In the embodiment of FIG. 1, my loss-of-vacuum relay 73 will respond to such a condition by operating to close its contacts 80 and trip a back-up circuit breaker that interrupts the current through the deficient interrupter. The back-up breaker, which is not shown, is connected in the power circuit 11, 12, 13 on the source side of the circuit breaker 14 and has a trip circuit 79 which is completed by closing of the contacts 80 of relay 73.

For preventing false operation of the relay 74 in response to a short period of current flow through an interrupter following complete opening of the circuit breaker, I rely upon the time-delay characteristics of relay 64 and upon the shunting circuit 77. If current flows through an interrupter 15, 16, or 17 after "a" switch contacts 60 have opened (in response to circuit-breaker opening), a voltage will quickly be developed across the d.c. terminals 70, 71 of the rectifier bridge 62. This voltage will be limited by the forward drop of the series-connected diodes 78 in the shunting circuit 77. This voltage will begin charging the capacitor 75, but if current flow through the interrupters 15, 16, and 17 is terminated prior to the capacitors' reaching the predetermined pick-up voltage of relay 73, the relay will remain inactive. Upon such termination of current flow through the interrupters, the voltage across the a.c. terminals 68, 69 of the rectifier bridge quickly drops to zero, following which the capacitor 75 discharges through the operating coil 76 of relay 73 without supplying sufficient current to operate relay 73.

Consider next the situation in which the circuit breaker is standing in its open position and leakage current begins flowing through one of the interrupters in response to a loss of vacuum. This leakage current will be sensed by the associated current transformer. If the leakage current exceeds a predetermined minimum value, e.g., a value that results in current in the current transformer secondary winding of 1% or more of rated secondary current, then a sufficient voltage will be developed across the d.c. terminals of the rectifier bridge 62 to operate the loss-of-vacuum relay 73.

My time-delay relay means 64 can be set to respond to very low values of a leakage current (e.g., 1% of rated current transformer primary current) without being damaged by very high values of fault current (e.g., 20 or more times rated current transformer primary current) because the high secondary currents developed during such fault current conditions are readily shunted without damage through the diodes 78 of the shunting circuit 77. The voltage developed across the d.c. terminals 70, 71 of the rectifier bridge 62 under these fault conditions is only slightly greater than the voltage developed when low values of leakage current flow through the interrupter.

It is to be noted that the "a" switch 61 is operated immediately upon opening of the circuit breaker 14. Operating this switch 61 immediately with no intentional time delay is desirable because such operation (i.e., opening of contacts 66) quickly interrupts the tripping circuit 50 and protects the tripping solenoid 25 against the effects of prolonged energization. This immediate operation of the "a" switch, however, by opening the contacts 60, immediately terminates isolation between loss-of-vacuum relaying means 64 and the current-sensing circuit 30. It is at this instant that the time-delay characteristics of the relay enter the picture and enable the relay to remain inactive should for some reason current continue to flow through one of the interrupters for a normal short period after complete separation of the interrupter's contacts.

To provide a clear indication that the loss-of-vacuum relay 73 has operated, a target relay 83 is provided. When the loss-of-vacuum relay 73 picks up, it closes its contacts 81 to complete an energizing circuit 82 for target relay 83. The target relay immediately picks up and actuates a clearly visible target 86 that indicates operation of the loss-of-vacuum relay 73. The target relay seals itself in through a set of seal-in contacts 85, thus remaining picked up even if the loss-of-vacuum relay 73 should drop out, e.g., when the back-up circuit breaker operates. To restore the target relay 83 after such operation to its position of FIG. 1, it is necessary to operate a manual reset switch 88, which interrupts the energizing circuit 82 for target relay 83 and allows the target relay to drop out.

The ilustrated target relay also includes a set of contacts 87 in the closing circuit 94 of the circuit breaker. The contacts 87 are shown in series with the closing operator 92 of the circuit breaker. Contacts 87 are opened when the target relay operates, thus preventing another closing of the circuit breaker until the target relay is reset.

Figure 2:
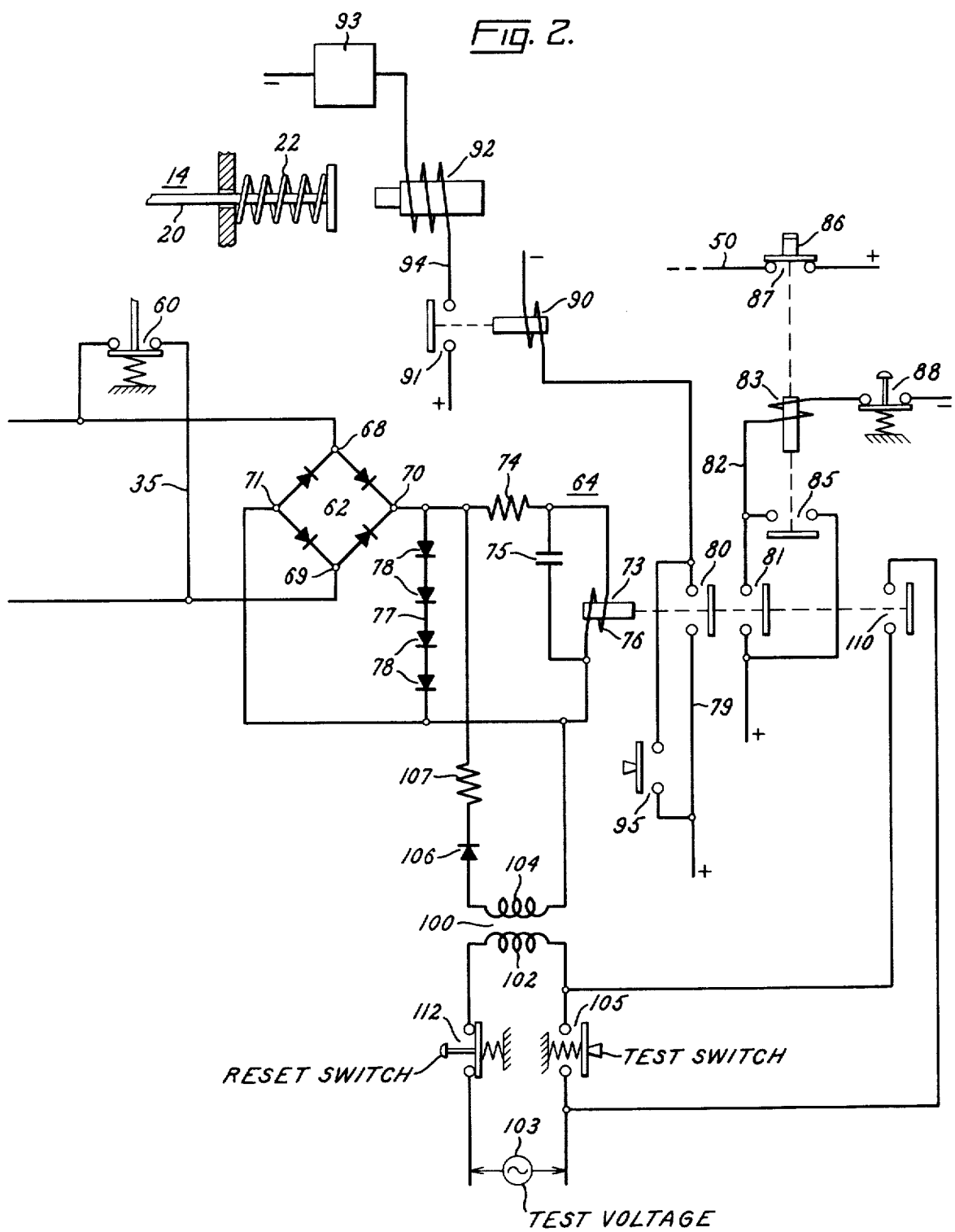
FIG. 2 is a schematic showing of loss-of-vacuum detecting means embodying another form of the invention.

Although I prefer to directly operate the back-up circuit breaker in response to operation of the loss-of-vacuum relay 73, I can instead immediately reclose the principal circuit breaker 14 and hold it closed. If the condition that initiated opening of circuit breaker 14 is still present at that time, the back-up circuit breaker will trip open following the circuit breaker's 14 closing and remaining closed. The circuit modifications relied upon to achieve this modified mode of operation are shown in FIG. 2. The other components remain the same as in FIG. 1 (except that a testing circuit, soon to be described, has been added to FIG. 2).

In FIG. 2, the contacts 80 of the loss-of-vacuum relay 73 are used to complete an energizing circuit 79 for a circuit breaker reclosing relay 90. This relay 90 responds by picking up to close its contacts 91, thereby completing an energizing circuit 94 for the circuit-breaker closing device 92. The closing device 92 responds by carrying out a closing operation, following which it is deenergized by suitable control circuitry 93 of a conventional design.

The principal circuit breaker 14 is prevented from again tripping open after such a closing operation by holding open its tripping circuit 50. As indicated in FIG. 2, this is accomplished by connecting the contacts 87 of the target relay 83 in the tripping circuit 50 and in series with the tripping solenoid 25. Once the target relay 83 picks up in response to operation of the loss-of-vacuum relay 73, it remains picked-up until manually reset, thereby preventing another tripping operation until manually reset.

Closing can be effected idependently of the loss-of-vacuum relay by closing a manually-controlled switch 95 in parallel with the contacts 80 of the loss-of-vacuum relay.

As mentioned hereinabove, the circuit of FIG. 2 includes means for testing the loss-of-vacuum relay 73 to determine at any given time whether it is operative. This test means comprises a transformer 100 having a primary winding 102 and a secondary winding 104. Primary winding 102 is connected in series with a normally-open test switch 105 across a source 103 of a.c. test voltage, e.g., 120 volts. The secondary winding 104 is connected in series with a diode 106 and a resistor 107, and this series combination is connected across the d.c. terminals 70, 71 of the bridging rectifier 62. When the test switch 105 is closed, a voltage comparable to that derived from the current transformers of FIG. 1 is applied by test transformer 100 and rectifier 106 across the terminals 70, 71. If the relay 73 is in good working condition, it will pick up in response to establishment of this voltage. This will cause the contacts 82 of the loss-of-vacuum relay 73 to close, thereby picking up the target relay 83, thus providing an indication that the loss-of-vacuum relay has operated.

In the illustrated embodiment of FIG. 2, the loss-of-vacuum relay will remain picked up by the test voltage even though the test swtich 105 is released and allowed to open. This is the case because the loss-of-vacuum relay has an extra set of contacts 110 that, upon closing in response to operation of the loss-of-vacuum relay, establish a shunting seal-in circuit around the test switch 105. Resetting of the loss-of-vacuum relay 73 can be effected when desired by opening reset switch 112 in series with the primary winding 102, thereby deenergizing the transformer 100 and allowing relay 73 to drop out.

The above-described testing operation can be carried out whether the principal circuit breaker 14 is open or closed. Even if the "a" switch contacts 60 are closed, as they would be when the circuit breaker is closed, the completed shorting path 35 is electrically isolated from the voltage applied by the testing transformer 100 because of the presence of bridging rectifier 62. The polarity of the testing voltage is such that bridging rectifier 62 blocks current through shorting path 35.

If it is desired to prevent the closing operator 92 from operating in response to pick-up of the loss-of-vacuum relay 73 during a testing operation, such result can be effected by providing a suitable manually-controlled switch (not shown) in the energizing circuit 79, which switch will be appropriately operated to hold open the energizing circuit 79 during this testing operation.

The testing circuit can be used not only to seal-in the loss-of-vacuum relay 73 during testing but also following a normal operation of the loss-of-vacuum relay. For example, assume that the loss-of-vacuum relay 73 is picked up in response to a voltage developed by one of the current transformer secondary windings 31, 32, or 33 of FIG. 1. Such pick-up would close contacts 110, thereby causing the test source 103 to apply voltage across terminals 70, 71 of the bridging rectifier. This latter voltage would continue to be present, even if the circuit breaker reclosed and "a" switch 60 was reclosed.

Although the testing circuit is illustrated as applied to the circuit of FIG. 2, it is to be understood that it can equally well be applied to the circuit of FIG. 1. This would be done in generally the same manner as disclosed with respect to FIG. 2.

Whether the loss-of-vacuum relay 73, in operating, trips a back-up circuit breaker, as in FIG. 1, or causes reclosing of the principal circuit breaker 14, as in FIG. 2, the effect of such relay operation is to initiate protective action that limits damage to the circuit breaker 14 from the condition (e.g., loss of vacuum) which initiated operation of the relay 73.

It is to be noted that my loss-of-vacuum detecting means utilizes only simple components of proven reliability. In the illustrated embodiment of FIG. 1, the only electronic components used are the diodes 78 and those present in bridge 62. In a typical example, these diodes are power-type diodes rated at 25 amperes continuous current and capable of passing currents exceeding 100 amperes for brief periods. In this example, the current transformers have a 2000 ampere primary rating and a 5 ampere secondary rating.

Although the illustrated time-delay relay means 64 comprises an R-C circuit, it is to be understood that other forms of time-delay relays could instead be used, such as a slugged telephone-type relay having built-in time delay pick-up provisions.

While I have shown and described particular embodiments of my invention, it will be obvious to those skilled in the art that various changes and modifications may be made without departing from the invention in its broader aspects; and I, therefore, intend herein to cover all such changes and modifications as fall within the true spirit and scope of my invention.

What I claim as new and desire to secure by Letters Patent of the United States is:

1. Loss-of-vacuum detecting means for any one of the three vacuum-type circuit interrupters of switchgear comprising a three-phase vacuum circuit breaker, said switchgear including: (i) three current transformer secondary windings respectively coupled to the three phase conductors of the power circuit extending through the breaker, (ii) a shorting conductor, (iii) means connecting said secondary windings in parallel with each other and in series with said shorting conductor, and (iv) three overcurrent relays, one for each phase, each relay having an input circuit connected in series with an associated current transformer secondary winding and with said shorting conductor; said detecting means comprising the aforesaid components (i), (ii), (iii), and:
   (a) a switch connected in said shorting conductor and in series with the parallel combination of said three current transformer secondary windings, said switch being closed when said circuit breaker is closed,
   (b) means for opening said switch when said circuit breaker is opened,
   (c) rectifying means connected across said switch and across the parallel combination of said current transformer secondary windings for developing a d.c. voltage when said switch is opened and one of said secondary windings is energized,
   (d) and time-delay relay means arranged to be energized by said d.c. voltage, said time-delay relay means being operable when the voltage thereacross exceeds a predetermined level for a predetermined minimum period following opening of said switch.

2. Loss-of-vacuum detecting means as defined in claim 1 in combination with means responsive to operation of said relay means for initiating protective action that limits damage to said circuit breaker from the condition which initiated operation of said relay means.

3. The apparatus of claim 2 in which said means responsive to operation of said relay means comprises tripping means for a circuit breaker backing-up said vacuum circuit breaker and connected in said power circuit, said tripping means being operable in response to operation of said relay means.

4. The apparatus of claim 2 in which said means responsive to operation of said relay means comprises reclosing means for said vacuum circuit breaker which operates to reclose said vacuum circuit breaker in response to operation of said relay means.

5. The apparatus of claim 1 in combination with non-linear resistivity conducting means connected across said time-delay relay means on the d.c. side of said rectifying means for shunting d.c. current from said current transformer windings and said rectifying means around said time-delay relay means when said switch of (a) is open and said d.c. current is high.

6. The apparatus of claim 5 in which said non-linear resistivity conducting means comprises a plurality of diodes connected in series and poled so that said d.c. voltage produces conduction of said diodes in a forward direction.

7. The apparatus of claim 1 in combination with a plurality of series-connected diodes connected across said time-delay relay means on the d.c. side of said rectifying means for limiting the voltage build-up across said time-delay relay means, said diodes being poled so that said d.c. voltage produces conduction of the diodes in a forward direction.

8. The apparatus of claim 1 in combination with:
   (a) a source of d.c. test voltage, and
   (b) a test circuit connected to said time-delay relay means on the d.c. voltage side of said rectifying means for applying said d.c. test voltage to said time-delay relay means, said d.c. test voltage having a polarity such that said rectifying means blocks flow of d.c. current from said source through said shorting conductor even when said switch in said shorting conductor is closed.

9. The apparatus of claim 8 in combination with:
   (a) a second switch operable to cause said d.c. test voltage to be applied through said test circuit to said time-delay relay means, and
   (b) means for operating said second switch in response to operation of said time-delay relay means, whereby said d.c. test voltage continues to be applied to said time-delay relay means even though said switch of (a), claim 1, is closed.

* * * * *